United States Patent
Webster (12)

(10) Patent No.: US 6,649,096 B2
(45) Date of Patent: Nov. 18, 2003

(54) METHOD OF MAKING A FILLED HONEYCOMB CORE COMPOSITE STRUCTURE

(75) Inventor: John D. Webster, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 100 days.

(21) Appl. No.: 09/917,850

(22) Filed: Jul. 30, 2001

(65) Prior Publication Data

US 2003/0020195 A1 Jan. 30, 2003

(51) Int. Cl.[7] .......................... B29C 44/06; B29C 53/02
(52) U.S. Cl. ..................... 264/46.6; 264/314; 264/320; 264/321; 264/295
(58) Field of Search .................... 264/46.6, 321, 264/313, 314, 320, 162, 295

(56) References Cited

U.S. PATENT DOCUMENTS 3,317,074 A * 5/1967 Barker, Jr. et al. ..... 220/560.15
3,879,245 A * 4/1975 Fetherston et al. .......... 264/321
4,687,691 A * 8/1987 Key ............................ 428/73
4,964,936 A * 10/1990 Ferro ......................... 156/242
5,188,879 A * 2/1993 Hill et al. .................... 428/117
5,338,594 A * 8/1994 Wang et al. ................. 428/117
5,580,502 A * 12/1996 Forster et al. ............. 264/46.5
5,824,255 A * 10/1998 Ross et al. .................. 264/316
5,834,082 A * 11/1998 Day ............................. 428/56
5,876,654 A * 3/1999 Blonigen et al. ........... 264/316

FOREIGN PATENT DOCUMENTS

EP       0 722 826        * 7/1996

* cited by examiner

Primary Examiner—Allan R. Kuhns

(57) ABSTRACT

The invention is a method of making a foam filled honeycomb core structure comprising the steps of: 1) providing a honeycomb core billet; 2) reinforcing the honeycomb core with foam; 3) placing the foam filled billet in mold having a curved mold surface; 4) creep forming the foam filled billet to the general shape of the structure by applying a load to the foam filled billet; and 5) machining the creep formed billet to the actual shape of the structure.

15 Claims, 3 Drawing Sheets

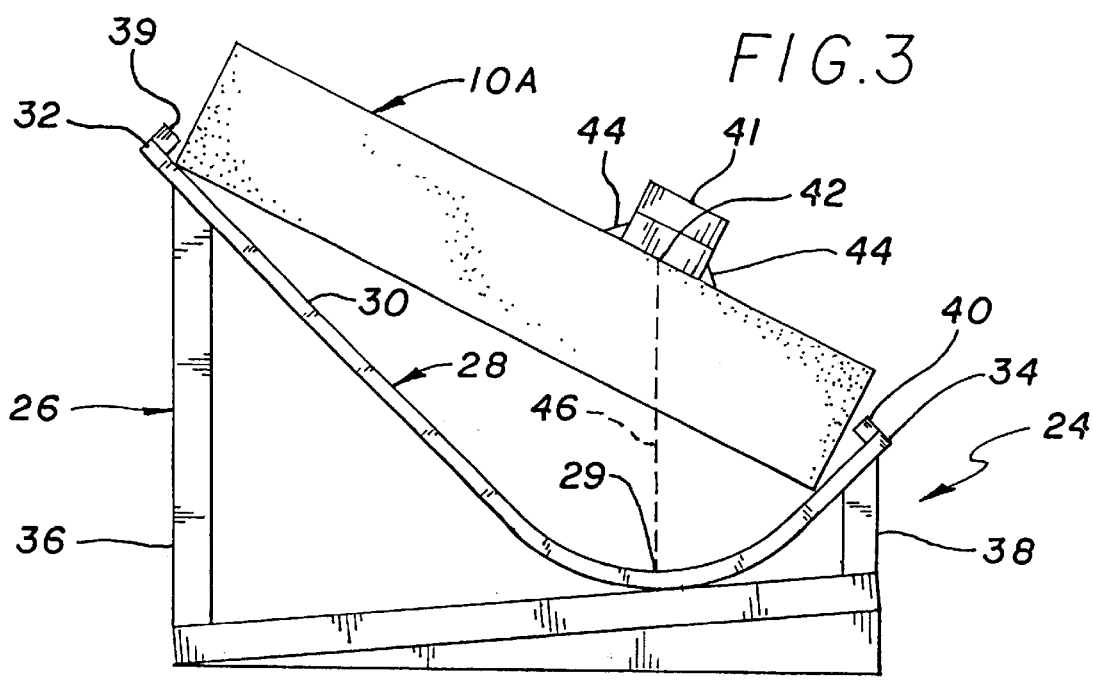
FIG.3
FIG.4
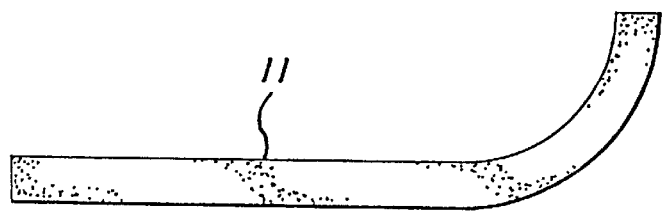
FIG.5

FIG.6
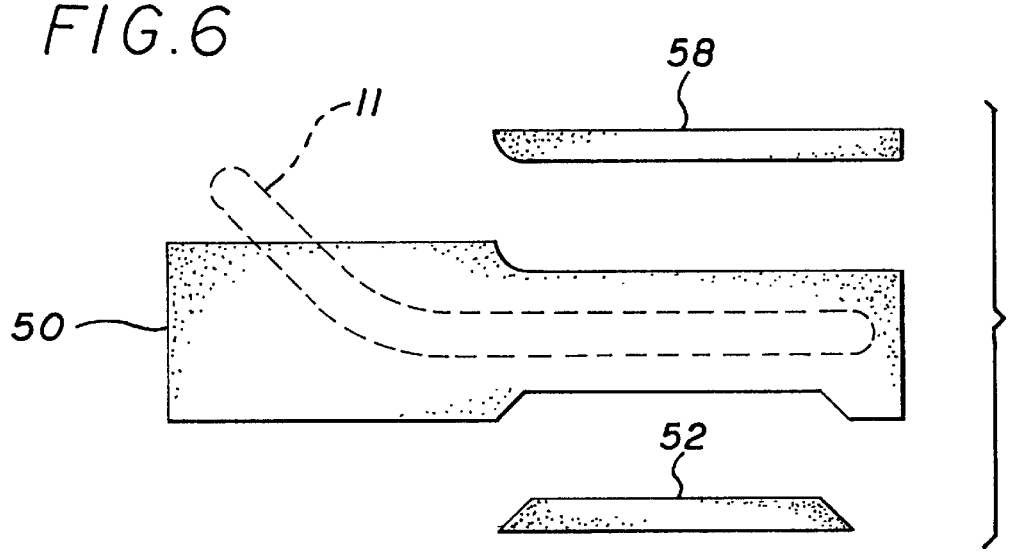
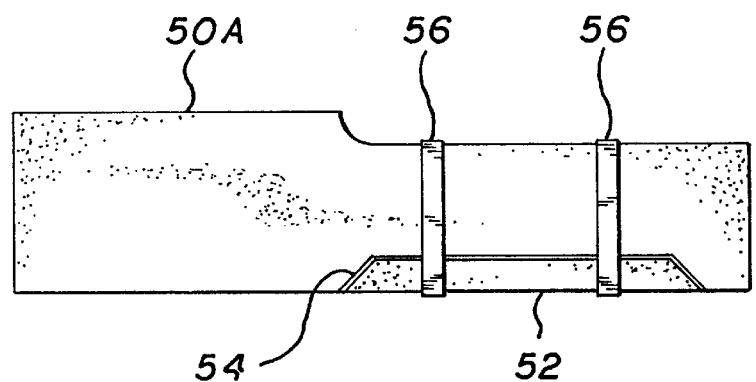
FIG.7
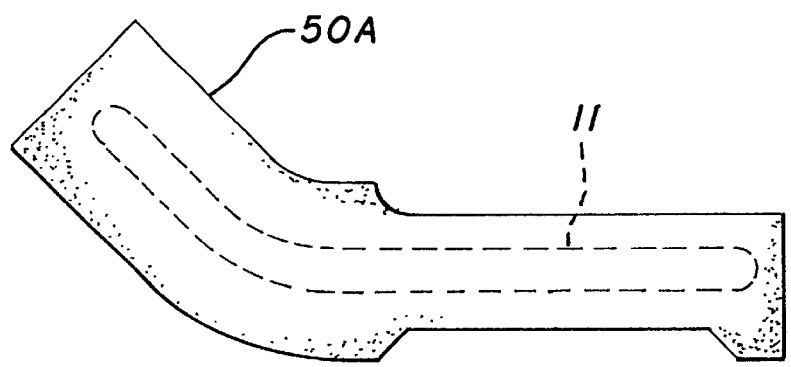
FIG.8

METHOD OF MAKING A FILLED HONEYCOMB CORE COMPOSITE STRUCTURE

BACKGROUND OF THE INVENTION

1. Field of the Invention

The invention relates to the field of composite structure fabrication and, in particular, to a method of manufacturing foam filled honeycomb core parts.

2. Description of Related Art

The manufacture of complex contoured parts from foam reinforced honeycomb is typically accomplished by loading the pieces of the core with the foam, curing the foam and bonding the pieces together, and thereafter machining to the final shape. This method is normally required because it is difficult to uniformly load honeycomb core having a very large depth. In addition, extremely large pieces of honeycomb core are expensive to manufacture.

This process has several significant disadvantages. The first being that the bonding of pieces of core together creates discontinuities, and therefore weakening the overall strength of the finished part. Secondly, if the finished part is thin and has a large contoured shape, a lot of material is wasted. Thirdly, in low observable structures for aircraft and the like, such discontinuities can effect the radar signature of the vehicle or structure.

What is desired is a method of manufacturing foam filled honeycomb core structures.

What is further desired is a method of manufacturing foam filled honeycomb core structures having a complex contour.

The desired method of manufacturing foam filled honeycomb core structures provides a complex contour with a minimum of wasted material.

The desired manufacturing method provides foam filled honeycomb core structures having a complex contour with no internal discontinuities.

SUMMARY OF THE INVENTION

The present disclosure relates to a method of making a foam filled honeycomb core structure having at least a partially curved shape. In detail, the method includes the steps of providing a honeycomb core billet. The billet is then reinforced by filling it with a foam. Thereafter the foam filled billet is placed on a mold having a curved mold surface. The foam filled billet is then creep formed to the general shape of the structure by applying a load thereto. The weights used for creep forming are typically applied to the foam filled billet at the point where maximum deformation is to occur. In addition, the mold is positioned such that the point where the load is applied to the foam filled billet and the point on the mold at the center of curvature are vertically aligned. Finally, the now curved foam filled billet is machined to the final shape of the structure.

If the foam is of the type that can be readily softened by heating to a moderately high temperature, such as a cross-linked polystyrene, it is heated to a temperature above its glass transition temperature prior to or during creep forming. This may require that the foam filled billet be vacuum bagged to prevent degradation by exposure to oxygen in the air.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a side view of the billet installed in the die prior to creep forming.

FIG. 4 is a perspective view of the billet in the die after forming to shape.

FIG. 5 is a view of the completed part after machining.

FIG. 6 is a side view of an oversize honeycomb core filled with a rigidizing foam with an excess material shown removed.

FIG. 7 is a view of the oversize honeycomb core shown in FIG. 6 with the "removed" excess material reattached.

FIG. 8 is a view of the oversize honeycomb core shown in FIG. 7 after creep forming.

DESCRIPTION OF THE PREFERRED EMBODIMENT

Figure 1:
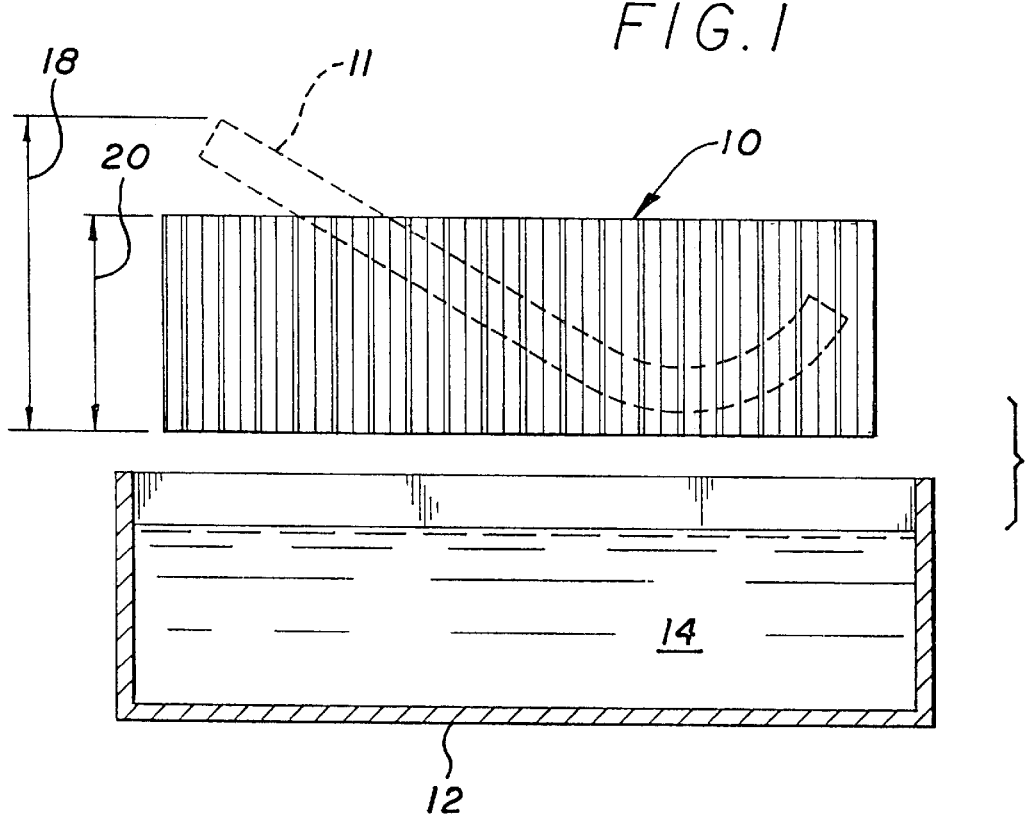
FIG. 1 is a side view of a honeycomb core billet positioned over a container filled with foam.
Figure 2:
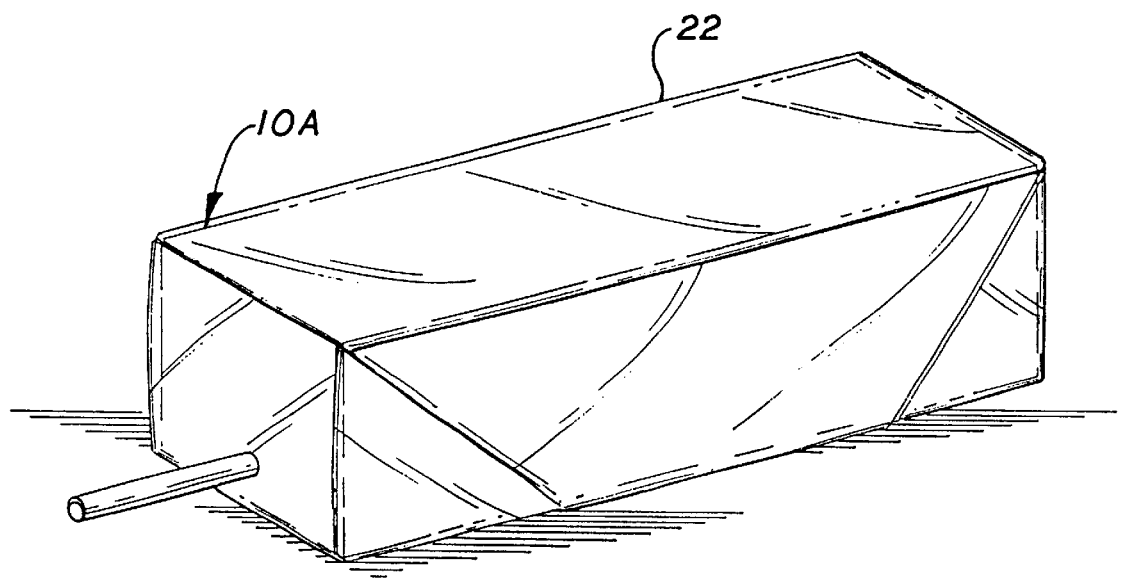
FIG. 2 is a side view of a honeycomb core filled with a rigidizing foam and enclosed in a vacuum bag.

Referring to FIGS. 1 and 2, a single piece of honeycomb core billet, generally indicated by numeral 10, is shown positioned over a container 12 filled with an uncured foam liquid 14. An outline of the completed part is shown in dotted lines and indicated by numeral 11. The height 18 of the completed part 11 is greater than the height 20 of the billet 10; however the subject fabrication process will allow such a part to made from the billet 10. The honeycomb core can be made from a great many materials, but must be able to be creep formed. For example, NOMEX (manufactured by E. I duPont de Nemous and Company, Wilmington, Del. or VECTRAN (manufactured by Hoechst Celanese, Charlotte, N.C., and SPECTRA (manufactured by Allied Signal, Petersburg, Va.). All these materials are readily available from a wide variety of distributors.

The core 10 is filled with foam by lowering the core 10 into the container 12 so that the liquid 14 can flow up through the cells of the core, thus insuring that the core is completely filled. Thereafter the liquid is allowed to cure. The preferred foam is a cross-linked polystyrene or various polyurethane foams. Subsequent processing involves heating to a temperature of 1800° F. to drive off moisture; however, other foam filler materials may not require such a step. In any case filling honeycomb core with foam is old in the art and need, therefore, not be discussed in further detail. Referring to FIG. 2, the foam filled core, now indicated by numeral 10A is then sealed in a vacuum bag 22 to protect the foam in subsequent processing steps. However, with some foam materials, the use of a vacuum bag 22 may not be necessary.

Referring to FIG. 3, the foam filled core 10A is then place in a forming fixture 24. The fixture 24 includes a base member 26 supporting a mold 28 having a surface 30 conforming to the contour completed part 11, with the point of maximum curvature, indicated by numeral 29. The ends 32 and 34 of the mold 28 are supported by vertical posts 36 and 38. The ends 32 and 34 of the mold 28 include mechanical stops 39 and 40, respectively, to prevent movement of the core 10A off the mold surface 30.

The foam filled core 10A is placed on the on the mold surface 28 and weights 41 are placed thereon at the point 42 where maximum curvature is to be achieved and is prevented from moving by stops 44 bonded to the core. The mold 26 is positioned such that the weights 41 are vertically over the point of maximum curvature, indicated by line 46. The foam filled core 10A is then heated to a temperature above the glass transition temperature. That is the temperature at which the foam is softened enough so that is will deform under a load. In one test using a Los Alamos National Laboratory provided cross-linked polystyrene foam, the core was heated to around 275 degrees F. for some 8 to 12 hours. Thereafter, the foam filled core had fully deformed to the contour of the mold surface 28, as illustrated in FIG. 4 and indicated by numeral 10B. Thereafter, the foam filled core 10B was removed form the fixture 24 and thereafter machined to the final shape off the part 11 shown in FIG. 5.

It is also possible to use oversize blocks of honeycomb. Referring to FIGS. 6, 7 and 8, a block of oversize foam filled honeycomb core 50 is first trimmed to remove excess material in the form of a trapezoid shaped section 52 from the area to undergo maximum bending. The trapezoid shaped section 52 is then reattached with a thin aluminum sheet 54 bent to conform to the shape of the "cut" between the section and core 50 by means of tape 56. Thereafter the "trimmed" block, now indicated by numeral 50A, is processed as previously described. After creep forming, the trapezoid shaped section 52 is removed and the foam filled core, now indicated by numeral 50A, can be machined. In addition, some material can also be removed from the opposite side, indicated by numeral 58. This material 58 need not be temporarily reattached. Thus it can be seen that oversize blocks of foam can be used, which could otherwise not be creep formed to the required contour.

Thus it can be seen that a highly contoured foam filled honeycomb part can be manufactured by the subject process from a single piece of honeycomb core eliminating splices and the resulting discontinuities. It should be noted that some experimentation will be required for each type of part depending upon its size, the final shape of the part and the type of core material and foam used. Thus the weights used and processing time and temperature cycle will very from part to part.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

What is claimed is:

1. A method of making a foam filled honeycomb core structure comprising the steps of:

providing a honeycomb core billet;

reinforcing the honeycomb core with foam;

placing the foam filled billet on a mold having a curved mold surface;

applying a load to the foam filled billet in alignment with a position at which maximum deformation of the foam filled billet is to occur; and creep forming the foam filled billet to the general shape of the structure by application of the load to the foam filled billet for a selected time duration.

2. The method as set forth in claim 1 further comprising:

elevating the temperature of the foam filled billet to a temperature wherein the foam is formable coincident with the creep forming step.

3. The method set forth in claim 1 further comprising:

applying the load to the foam filled billet in alignment with a center of curvature of the curved mold surface.

4. The method as set forth in claim 3 further comprising:

positioning the mold such that the load is applied to the foam filled billet in vertical alignment with the point of maximum curvature of the mold.

5. The method as set forth in claim 1 further comprising:

machining the creep formed billet to the actual shape of the structure.

6. The method as set forth in claim 1 further comprising:

removing a trapezoidal shaped section from a bottom surface of the foam filled billet to form a reduced cross-section portion.

7. The method as set forth in claim 6 further comprising:

placing a metal sheet into the reduced cross-section portion.

8. The method as set forth in claim 7 further comprising:

reinstalling the trapezoidal shaped section into the reduced cross-section portion.

9. The method as set forth in claim 8 further comprising:

releasably securing said trapezoidal shared section.

10. The method as set forth in claim 9 further comprising:

placing the bottom surface of foam filled billet facing the mold surface during placement of the foam filled billet on the mold.

11. The method as set forth in claim 1 further comprising:

vacuum bagging the foam filled billet prior to creep forming the foam filled billet.

12. The method as set forth in claim 1 further comprising:

forming a foam filled honeycomb structure with a complex contour and no internal discontinuities.

13. The method as set forth in claim 1 further comprising:

forming a foam filled honeycomb structure with a complex contour and a reduced amount of wasted material.

14. A method of making a foam filled honeycomb core structure comprising the steps of:

providing a honeycomb core billet;

reinforcing the honeycomb core with foam:

placing the foam filled billet on a mold having a curved mold surface;

creep forming the foam filled billet to the general shape of the structure by applying load to the foam filled billet, wherein prior to said step of creep forming the foam filled billet to the general shape of the structure by applying a load to the foam filled billet, the step of positioning the mold such that point of applying a load to the foam filled billet and point on the mold of maximum curvature are vertically aligned, wherein prior to said step of creep forming the foam filled billet to the general shape of the structure, the step of vacuum bagging the foam filled billet; and machining the creep formed billet to the actual shape of the structure.

15. A method of making a foam filled honeycomb core structure comprising the steps of:

providing a honeycomb core billet;

reinforcing the honeycomb core with foam;

placing the foam filled billet on a mold having a curved mold surface;

creep forming the foam filled billet to the general shape of the structure by applying a load to the foam filled billet, wherein prior to said step of creep forming the foam filled billet to the general shape of the structure by applying a load to the foam filled billet, the step of positioning the mold such that point of applying a load to the foam filled billet and point on the mold of maximum curvature are vertically aligned; and machining the creep formed billet to the actual shape of the structure, wherein the foam filled billet has a top surface and a bottom surface, and prior to said step placing the foam filled billet on a mold having a curved mold surface, the steps of:

removing a trapezoidal shaped section from the bottom surface of the foam filled billet forming a reduced cross-section portion therein;

placing a metal sheet into the reduced cross-section portion;

reinstalling the trapezoidal shaped section into the reduced cross-section portion; and releasably securing said trapezoidal shaped section; and during said step of placing the foam filled billet on a mold having a curved mold surface, placing the bottom surface of foam filled billet facing the mold surface.

\* \* \* \* \*